US012582139B2

(12) United States Patent
    Gray

(10) Patent No.: US 12,582,139 B2
(45) Date of Patent: Mar. 24, 2026

(54) CAKE DECORATING TOOL

(71) Applicant: Pamela Gray, Houston, TX (US)

(72) Inventor: Pamela Gray, Houston, TX (US)

( * ) Notice: Subject to any disclaimer, the term of this patent is extended or adjusted under 35 U.S.C. 154(b) by 18 days.

(21) Appl. No.: 17/683,733

(22) Filed: Mar. 1, 2022

(65) Prior Publication Data

US 2023/0276823 A1      Sep. 7, 2023

(51) Int. Cl.
    *A23G 3/28*      (2006.01)
    *A21C 15/00*      (2006.01)

(52) U.S. Cl.
    CPC .............. *A23G 3/28* (2013.01); *A21C 15/005* (2013.01)

(58) Field of Classification Search
    CPC ................................ A23G 3/28; A21C 15/005
    See application file for complete search history.

(56) References Cited

U.S. PATENT DOCUMENTS

| | | | | | |
|---|---|---|---|---|---|
| 4,873,100 | A | * | 10/1989 | Dirksing | B65D 1/0292 |
| | | | | | 426/115 |
| 5,370,250 | A | * | 12/1994 | Gilbert | B65D 23/00 |
| | | | | | 220/666 |

| | | | | | |
|---|---|---|---|---|---|
| 6,101,968 | A | * | 8/2000 | Fitzgibbons | A23G 3/28 |
| | | | | | 222/327 |
| 10,259,161 | B2 | * | 4/2019 | Lipton | B33Y 30/00 |
| 10,492,500 | B1 | * | 12/2019 | Siwak | B65D 83/0055 |
| 2010/0126997 | A1 | * | 5/2010 | Stull, Sr. | B65D 50/041 |
| | | | | | 220/281 |
| 2010/0147885 | A1 | * | 6/2010 | Braxton | B65D 35/38 |
| | | | | | 222/106 |
| 2019/0127129 | A1 | * | 5/2019 | Van Den Hoonaard | |
| | | | | | A63H 33/08 |
| 2021/0024261 | A1 | * | 1/2021 | Brown, II | A47G 19/2288 |
| 2021/0261305 | A1 | * | 8/2021 | Ni | B65D 43/0229 |

FOREIGN PATENT DOCUMENTS

| | | | | | |
|---|---|---|---|---|---|
| WO | WO-9215501 | A1 | * | 9/1992 | A23G 9/28 |
| WO | WO-2006093952 | A1 | * | 9/2006 | B65D 1/265 |
| WO | WO-2021225669 | A1 | * | 11/2021 | A45F 3/16 |

OTHER PUBLICATIONS

WO-9215501-A1 Espacenet Description with line numbers (Year: 2023).*

* cited by examiner

*Primary Examiner* — Joseph S Del Sole

(74) *Attorney, Agent, or Firm* — Delphine James

(57)      ABSTRACT

The present invention comprises an accordion shape bottom container with a complementary lid having cake decorating tips incorporated therein. The lid further includes a one or more child protective connections to prevent the child from inadvertently wasting the contents of the container.

14 Claims, 16 Drawing Sheets

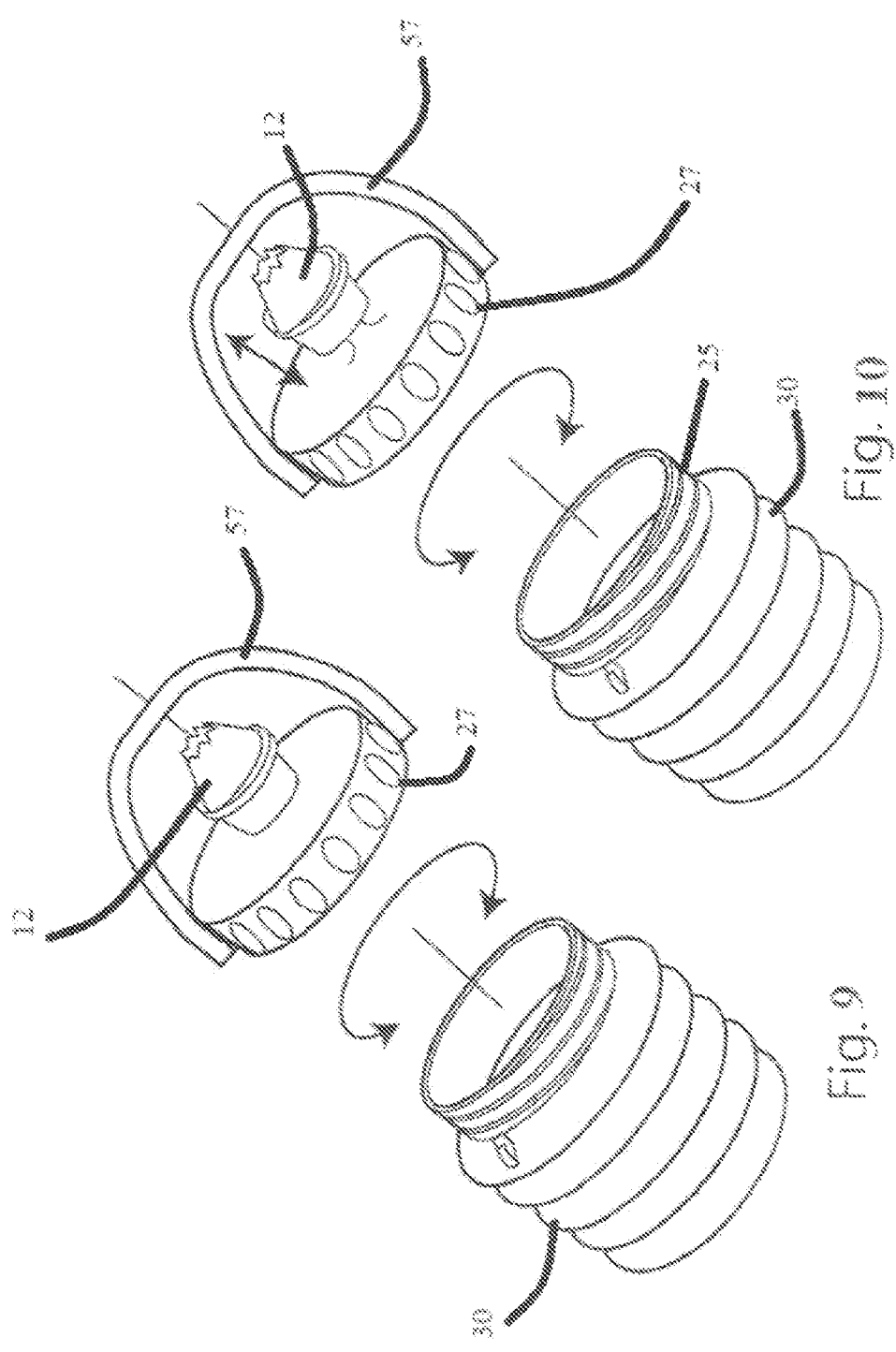

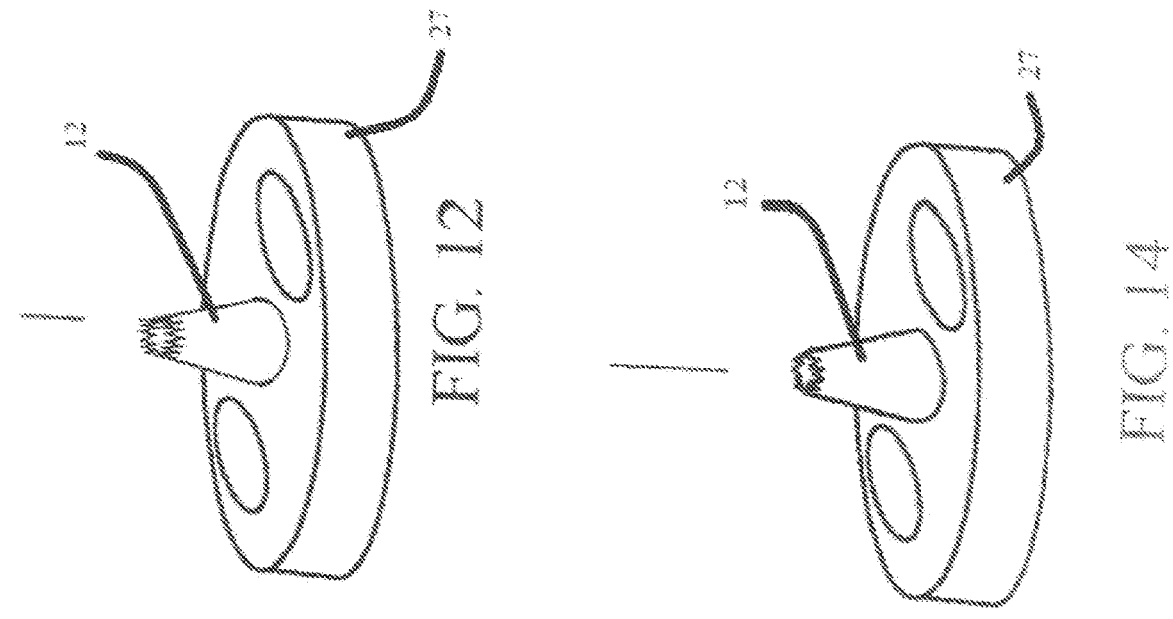
FIG. 11
FIG. 12
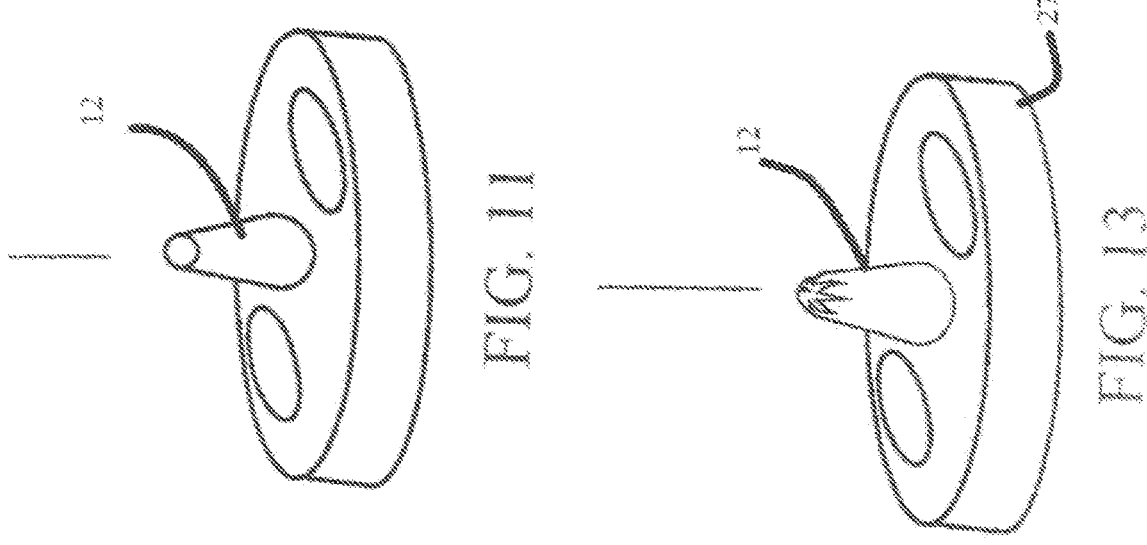
FIG. 13
FIG. 14

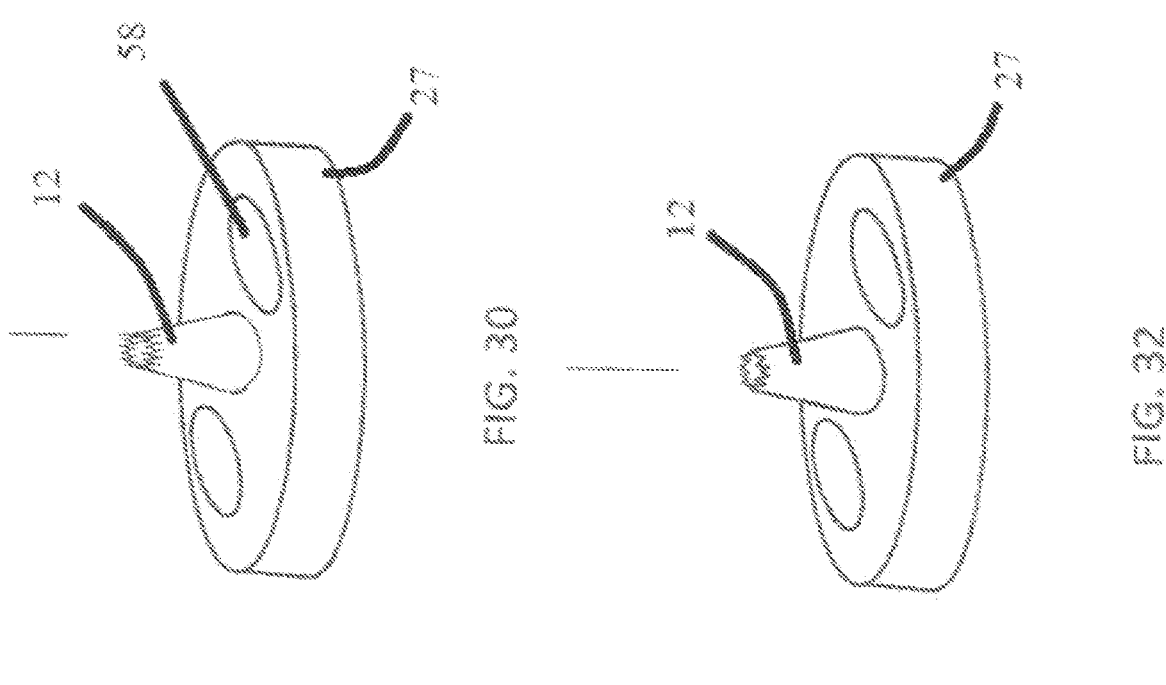
FIG. 29
FIG. 30
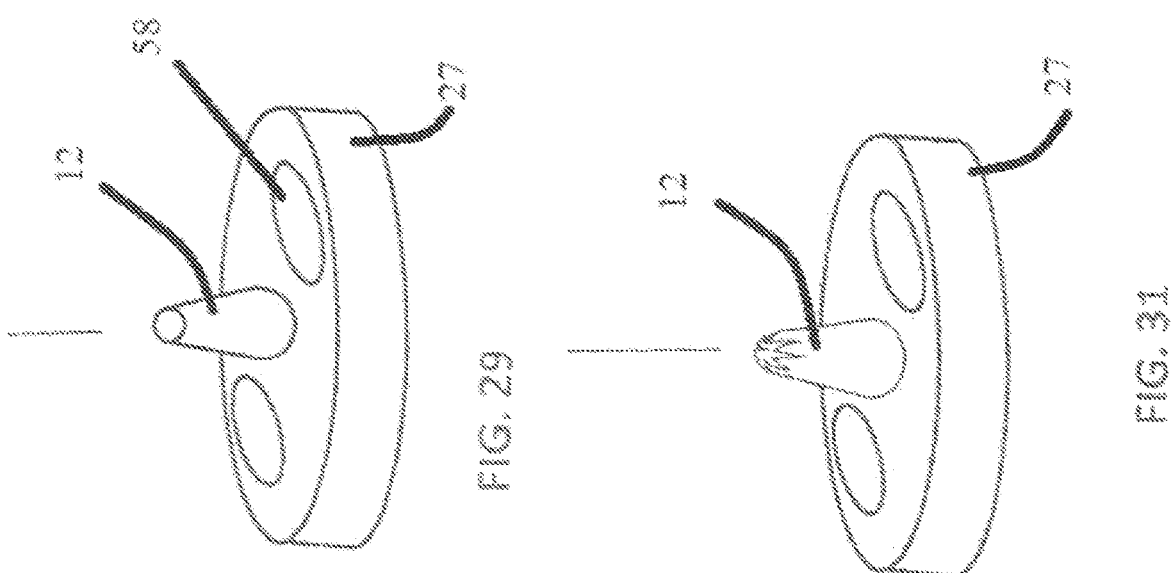
FIG. 31
FIG. 32

CAKE DECORATING TOOL

BACKGROUND OF THE INVENTION

The present invention relates to baking accessories. More specifically the present invention relates to cake decorating accessory tool.

Cake decorating has become a work of art. Cake decorating is one of the sugar arts that uses icing or frosting and other edible decorative elements to make plain cakes more visually interesting. Decorating cakes has become a form of unique artistry, that can be performed on a single-layer cake to a multi-layered 3-dimensional cake creation.

Today people hire bakeries to decorate their cake commensurate with the special event. However, cakes have been decorated for many centuries for special occasions. Wedding and birthday cakes have the longest traditions and can be considered the most artistic form.

Decorating a cake usually involves covering it with some form of icing and then using decorative sugar, candy, chocolate or icing decorations to embellish the cake.

The present invention provides a novel tool to assist children in decorating cupcakes or small personal cakes.

SUMMARY OF THE INVENTION

One objective of the present invention is to provide a cost-effective and durable, tool for cake decorating.

Another objective of the present invention is to a tool to assist in the training of children to create decorating art.

The present invention comprises an accordion shape bottom container with a complementary lid having cake decorating tips incorporated therein. The lid further includes a one or more child protective connections to prevent the child from inadvertently wasting the contents of the container.

The above and other objects, features and advantages of the present invention should become even more readily apparent to those skilled in the art upon a read in of the following detailed description in conjunction with the drawings wherein there is shown and described illustrative embodiments of the invention.

BRIEF DESCRIPTION OF DRAWINGS

These and other details of the present invention will be described in connection with the accompanying drawings, which are not furnished only by way of illustration and not in limitation of the invention.

FIGS. 9 and 10 are a perspective view of the lid member with an alternative handle.

FIGS. 11-14 are a cutaway view of an alternative view of the lid member.

FIGS. 29-32 illustrate the different design of the spouts in FIG. 27.

DETAILED DESCRIPTION OF THE INVENTION

The detailed description set forth below in connection with the appended drawings is intended as a description of the presently preferred embodiments of a portable beverage container and components thereof provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
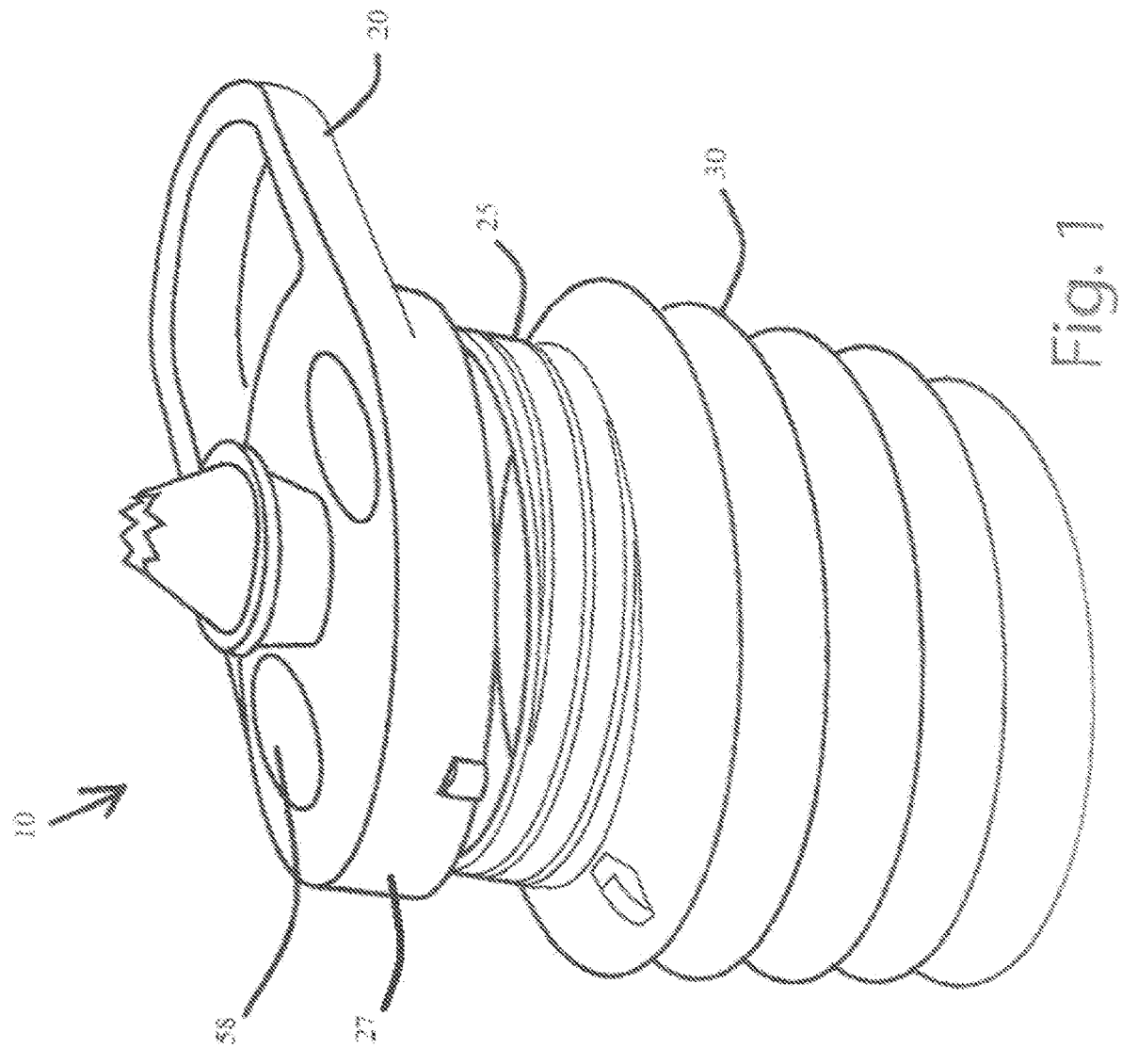
FIG. 1 is a perspective view of one embodiment of the present invention, cake decorating tool with the handle extending from the top of the lid.
Figures 2, 3:
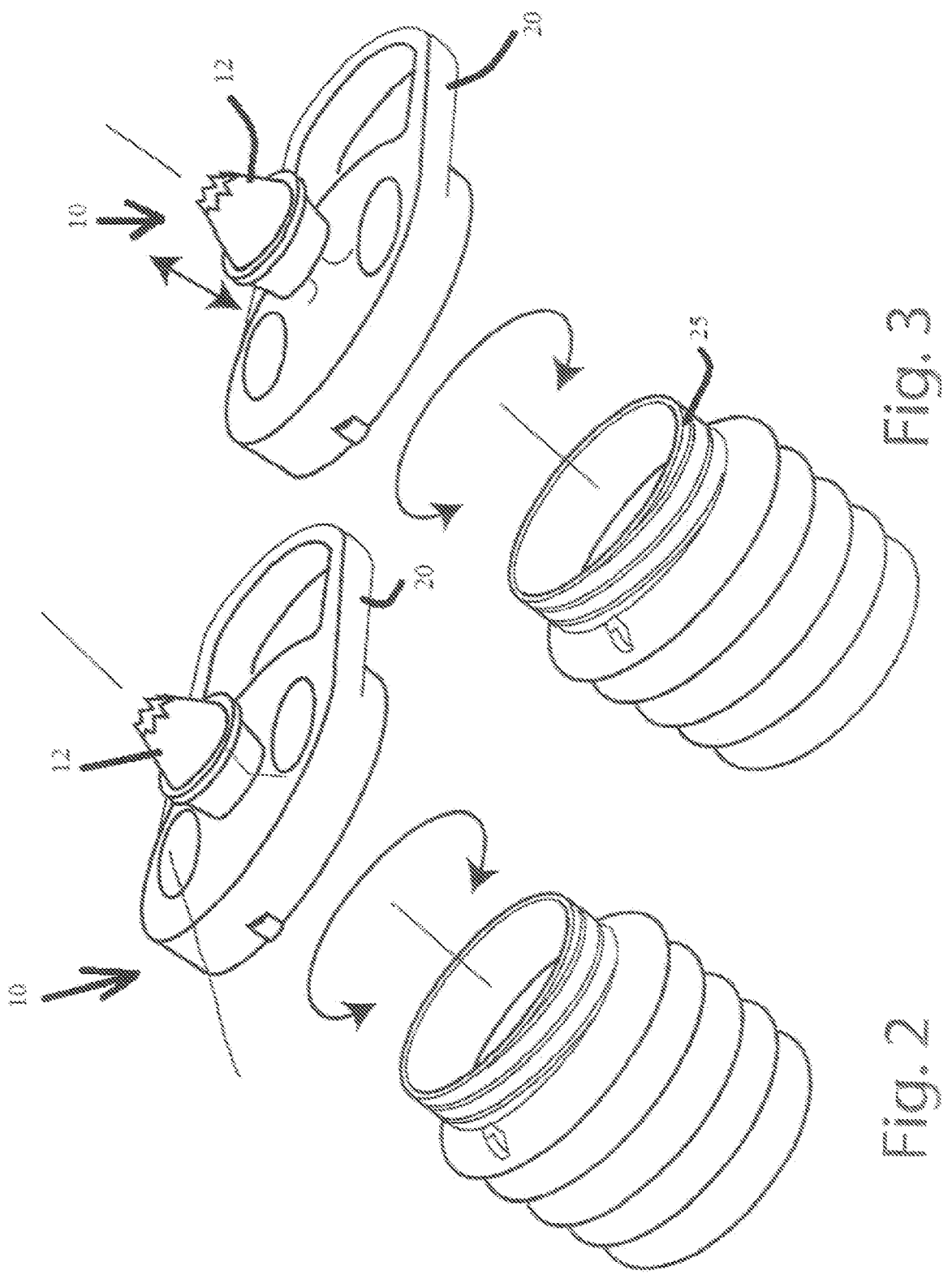
FIG. 2 is a frontal perspective view of the cap removed from the bottom container with the spout closed.
FIG. 3 is cutaway frontal perspective view of the cap removed from the bottom container with the spout extended.
Figures 4, 5, 6, 7:
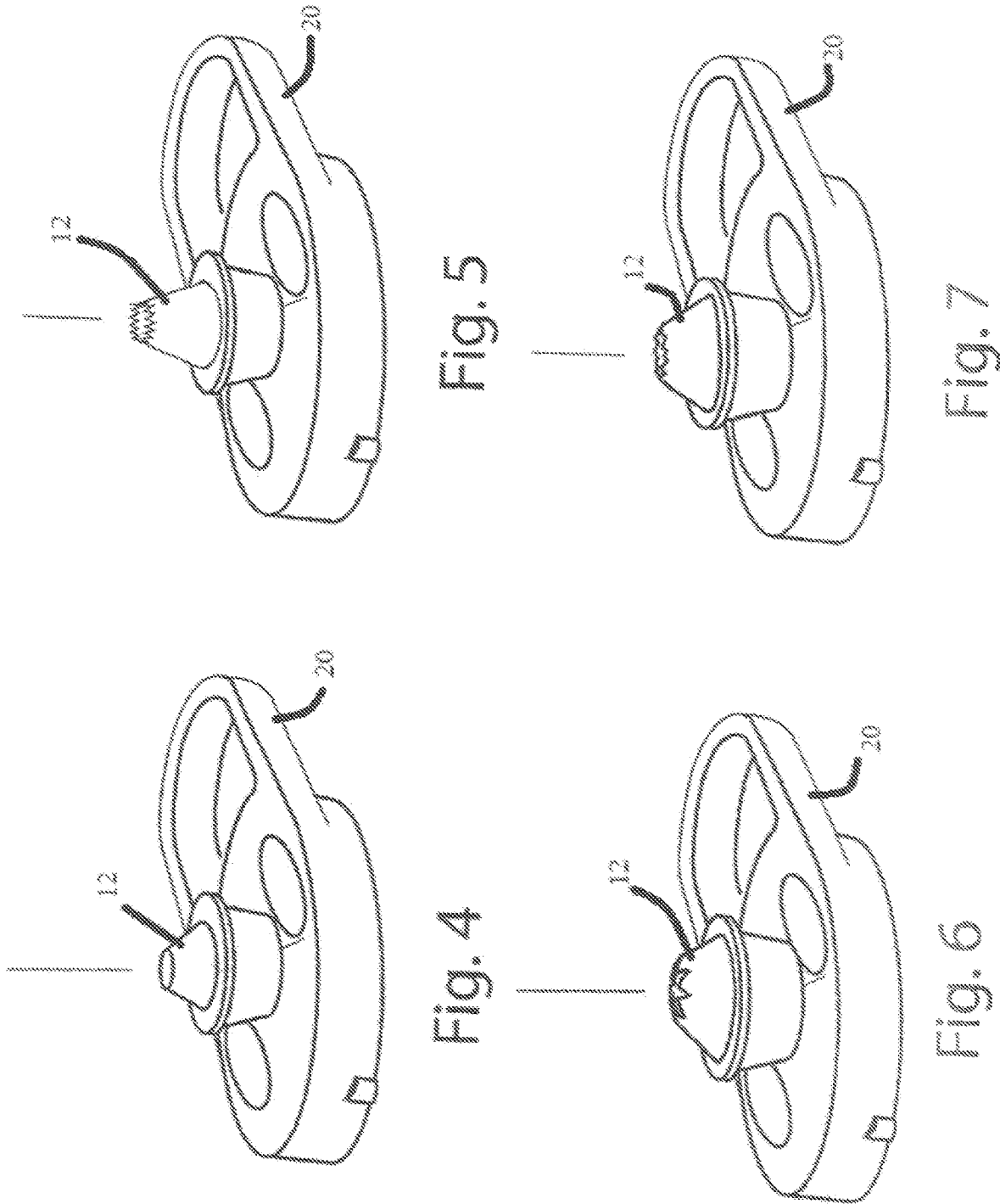
FIGS. 4-7 are cutaway frontal perspective view of various embodiments of top of the spout the lid member of the embodiment shown in FIG. 1.
Figure 8A:
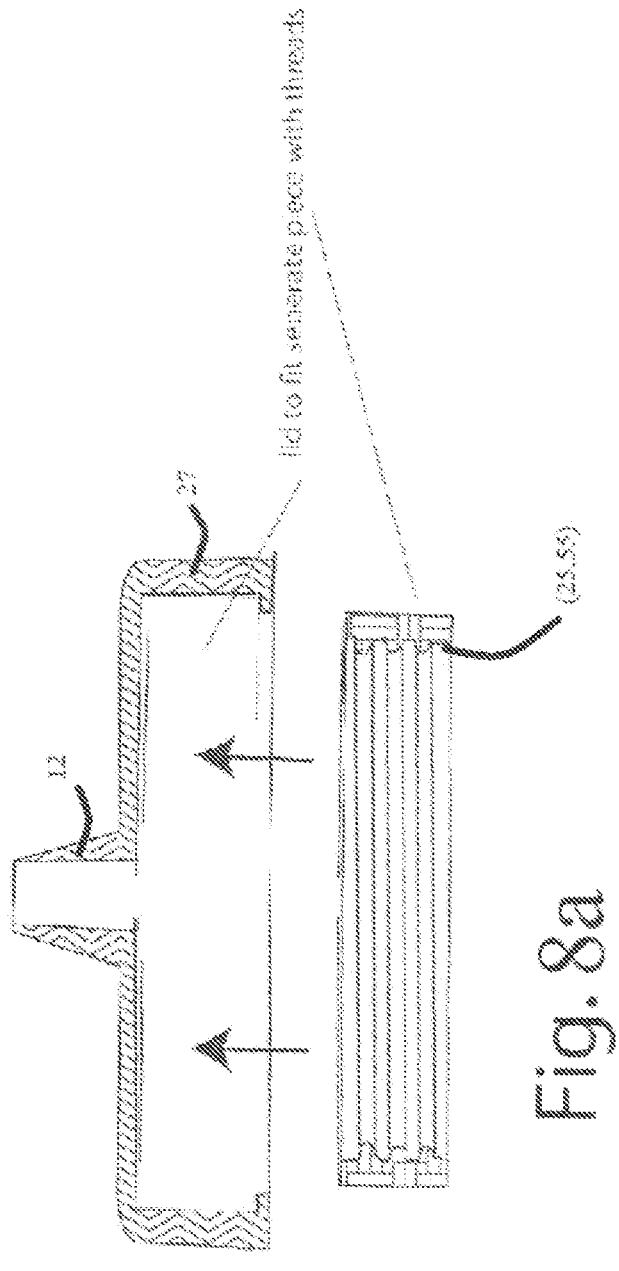
FIG. 8a-8c are cross section view of the lid member depicting the child protective connections.
Figure 8C:
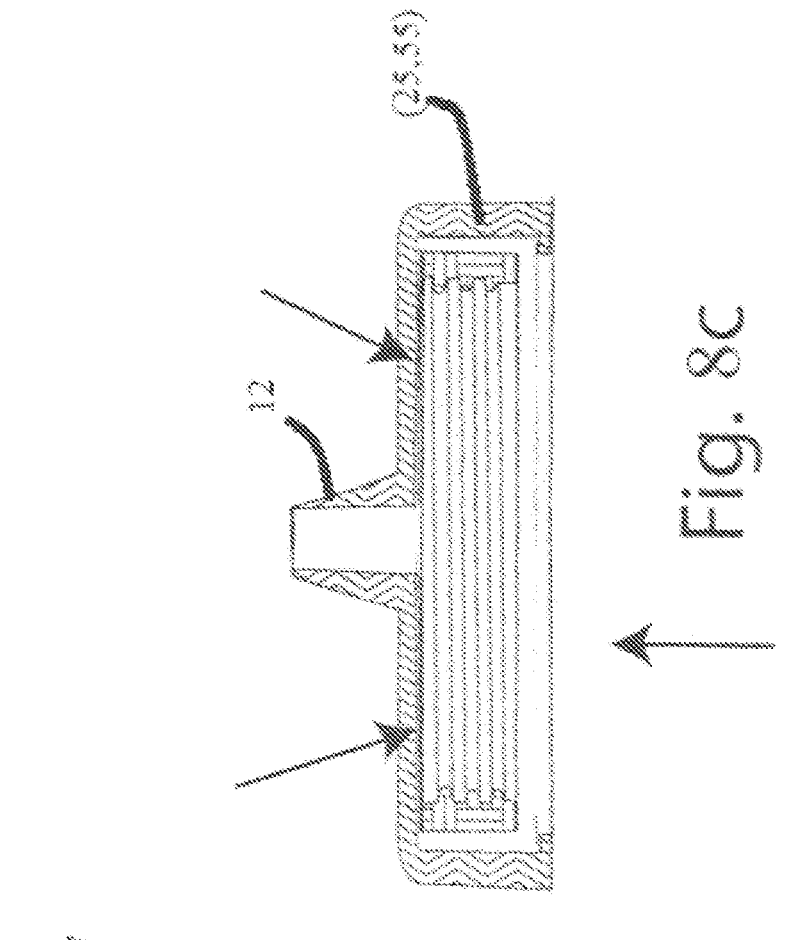
Figure 8B:
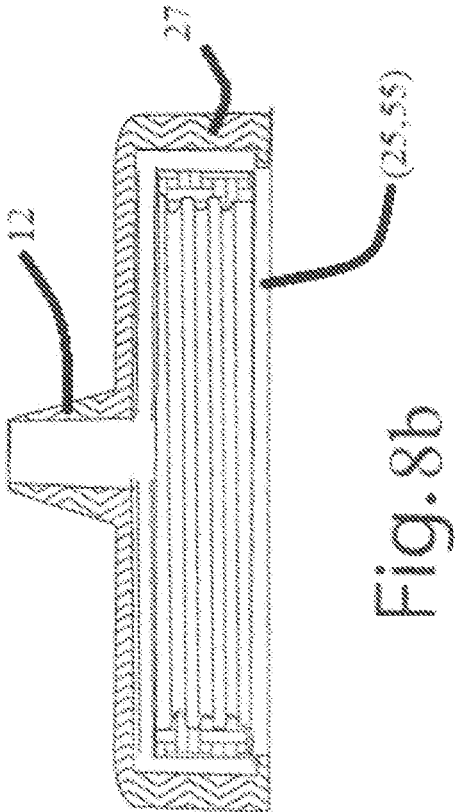
Figure 15:
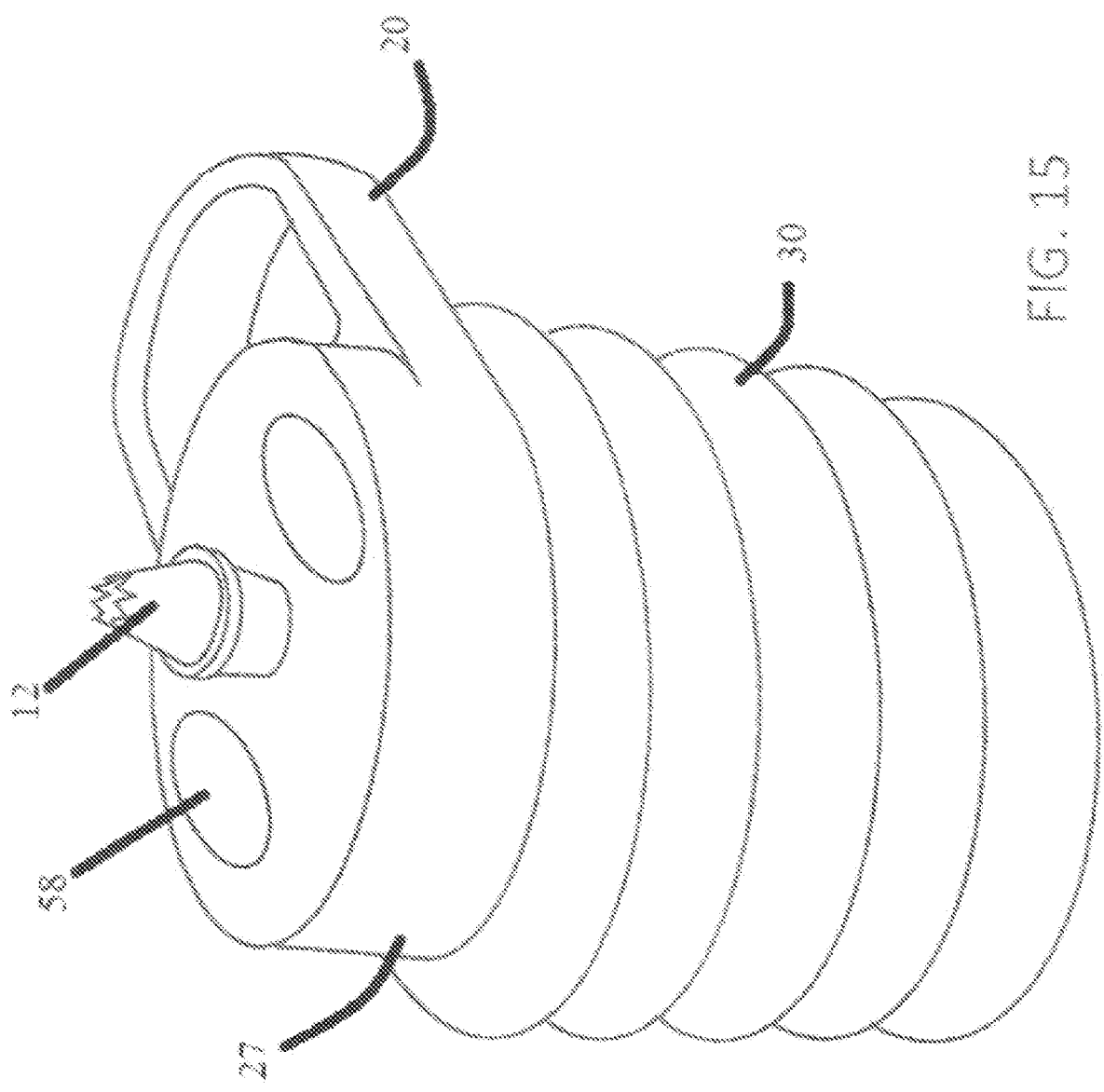
FIG. 15 illustrates an alternative embodiment of the handle extending from the bottom of the lid.
Figure 16:
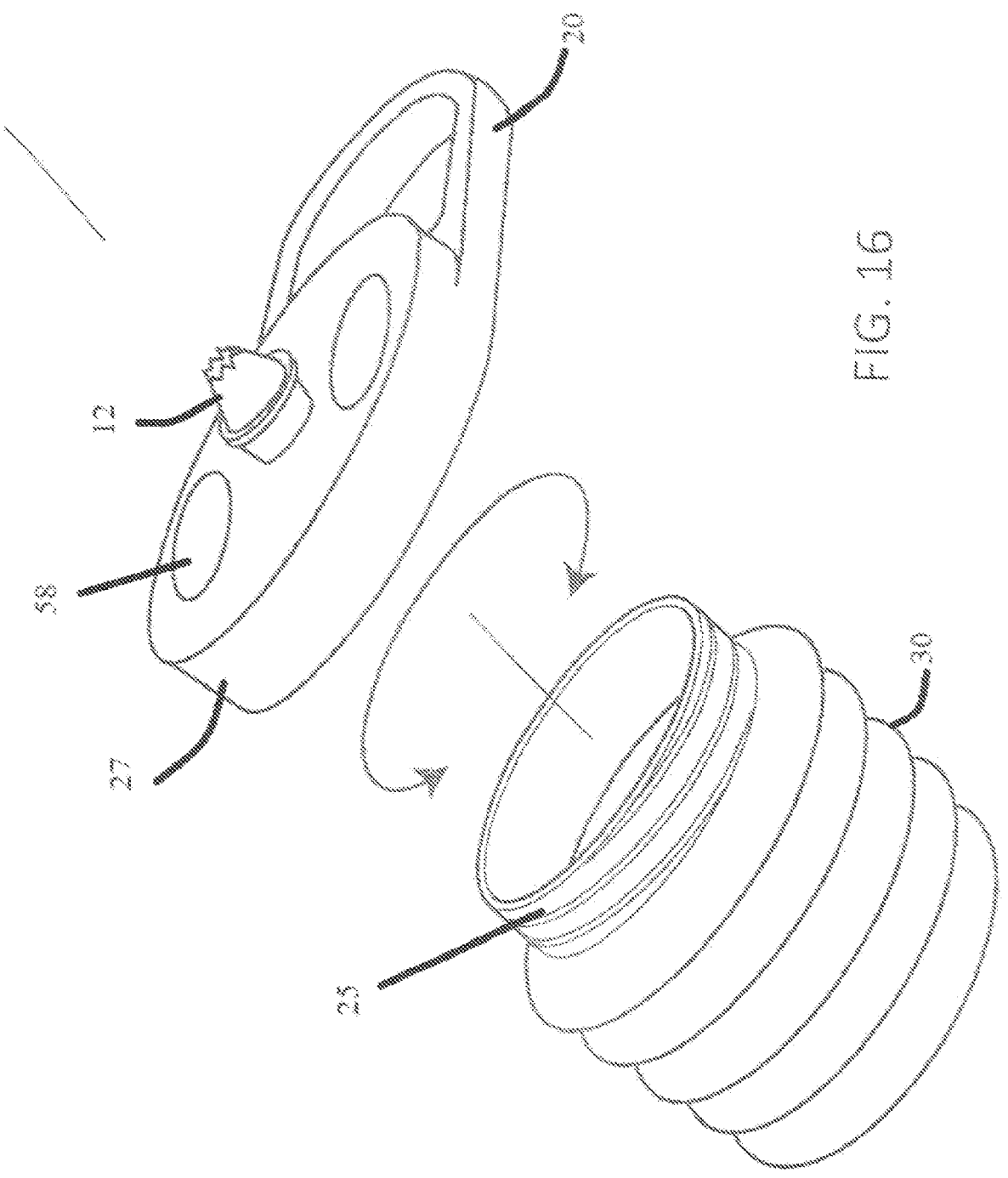
FIG. 16 illustrates the spout configuration of the embodiment in FIG. 15.
Figures 17, 18, 19, 20:
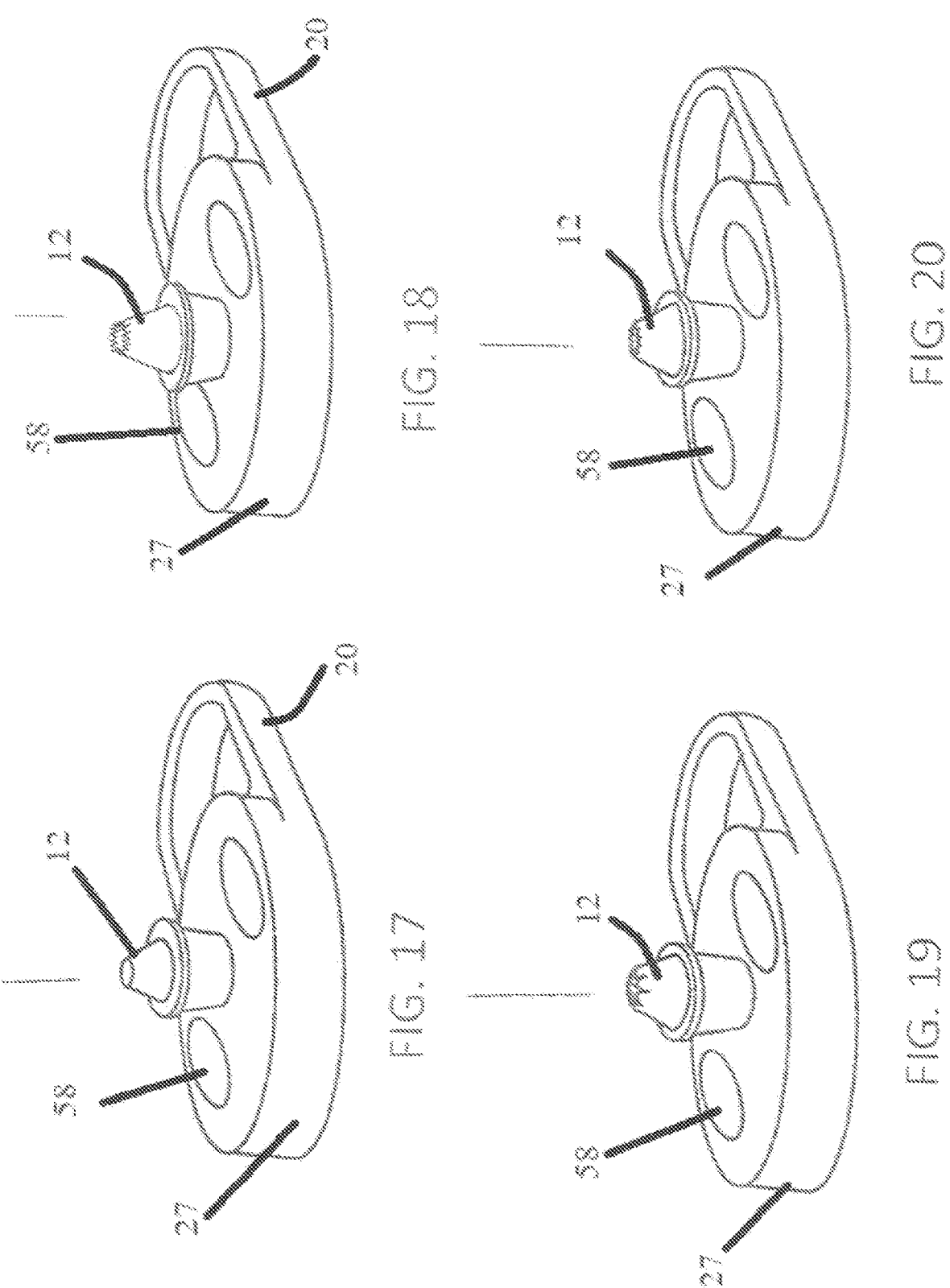
FIGS. 17-20 shows an alternative design of the spout.
Figure 21:
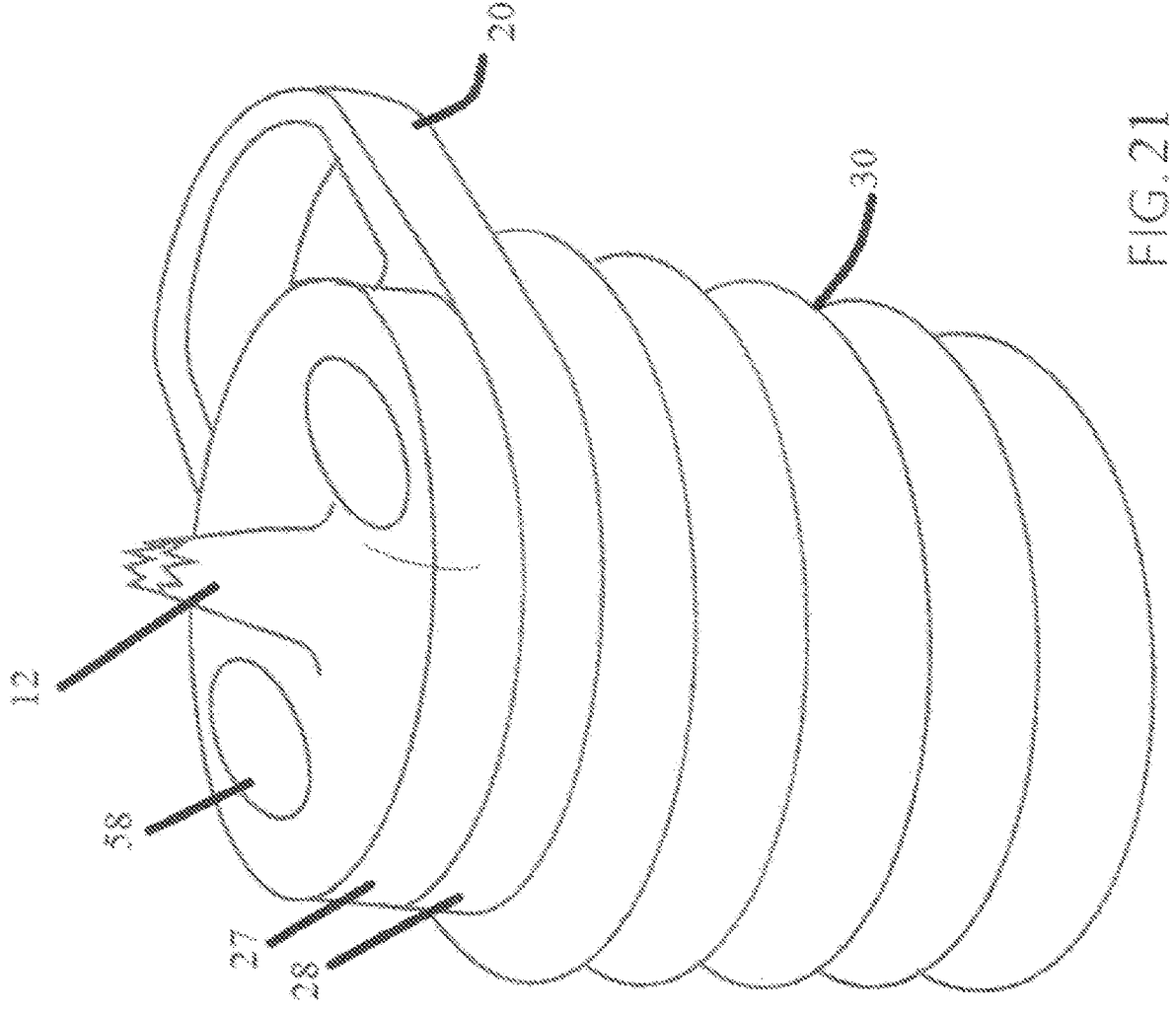
FIG. 21 illustrates a separated handle attached to the lid.
Figure 22:
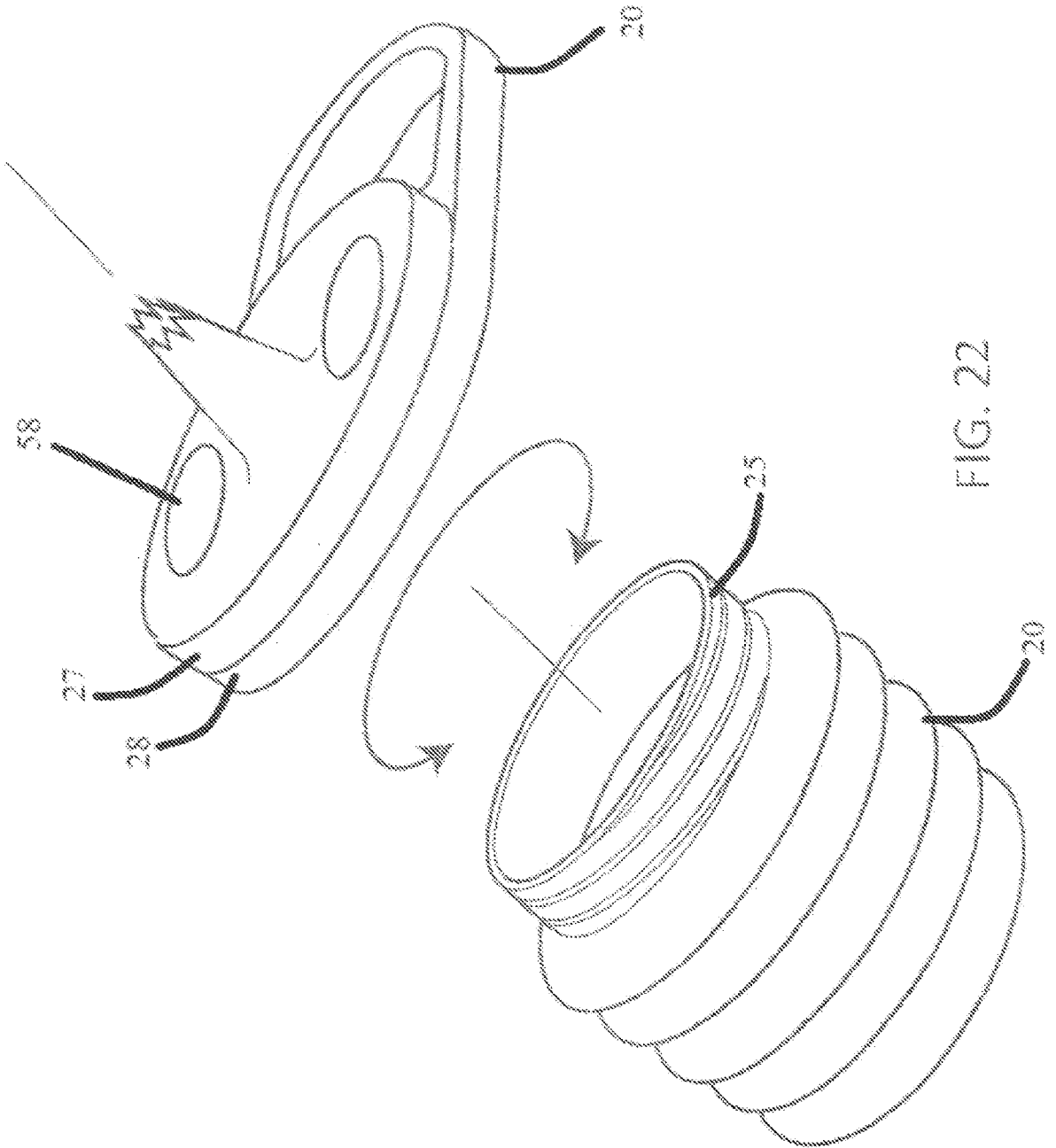
FIG. 22 illustrates a separated handle detached from the bottom container.
Figures 23, 24, 25, 26:
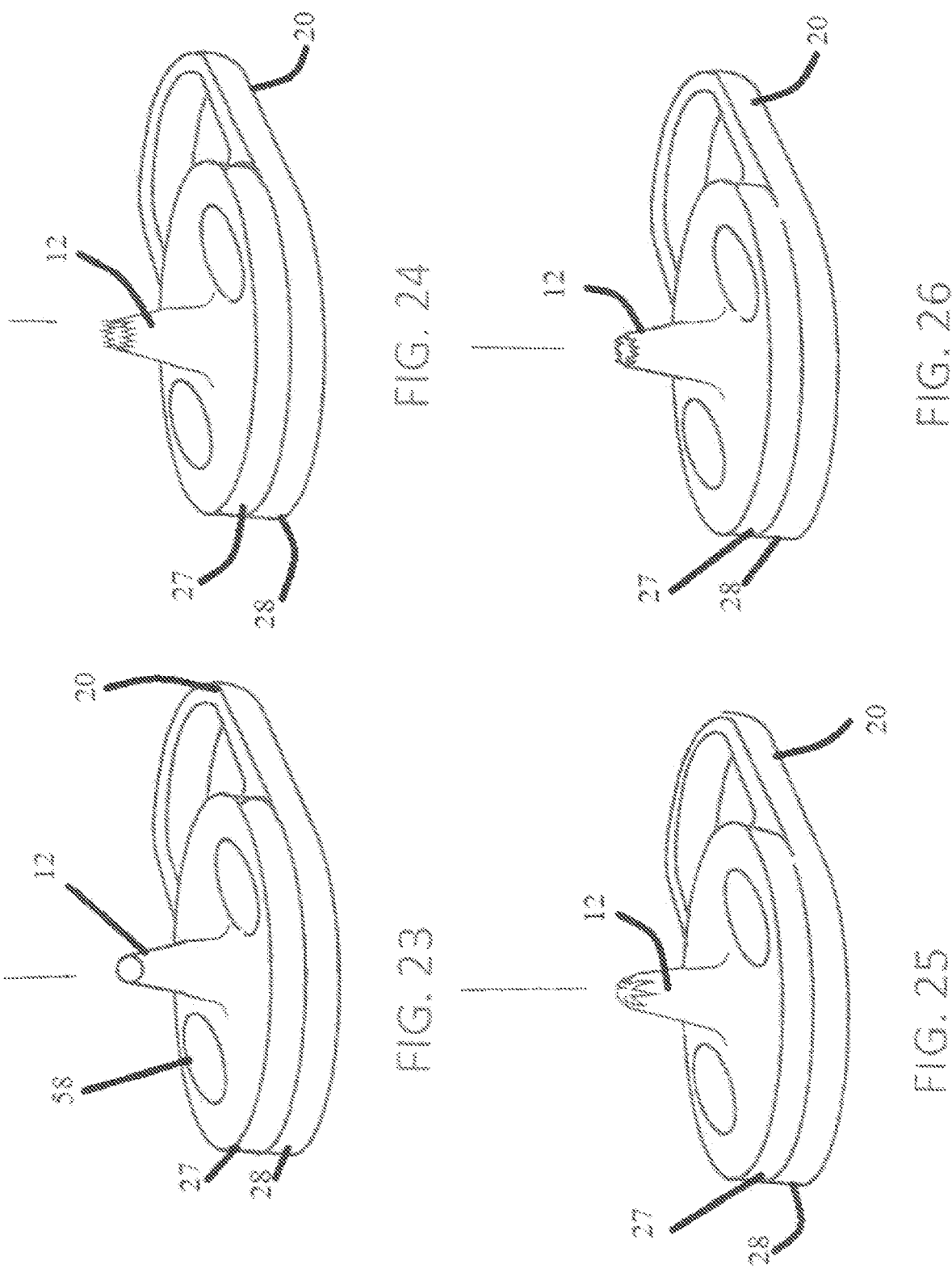
FIGS. 23-26 illustrates alternative spout designs.
Figure 27:
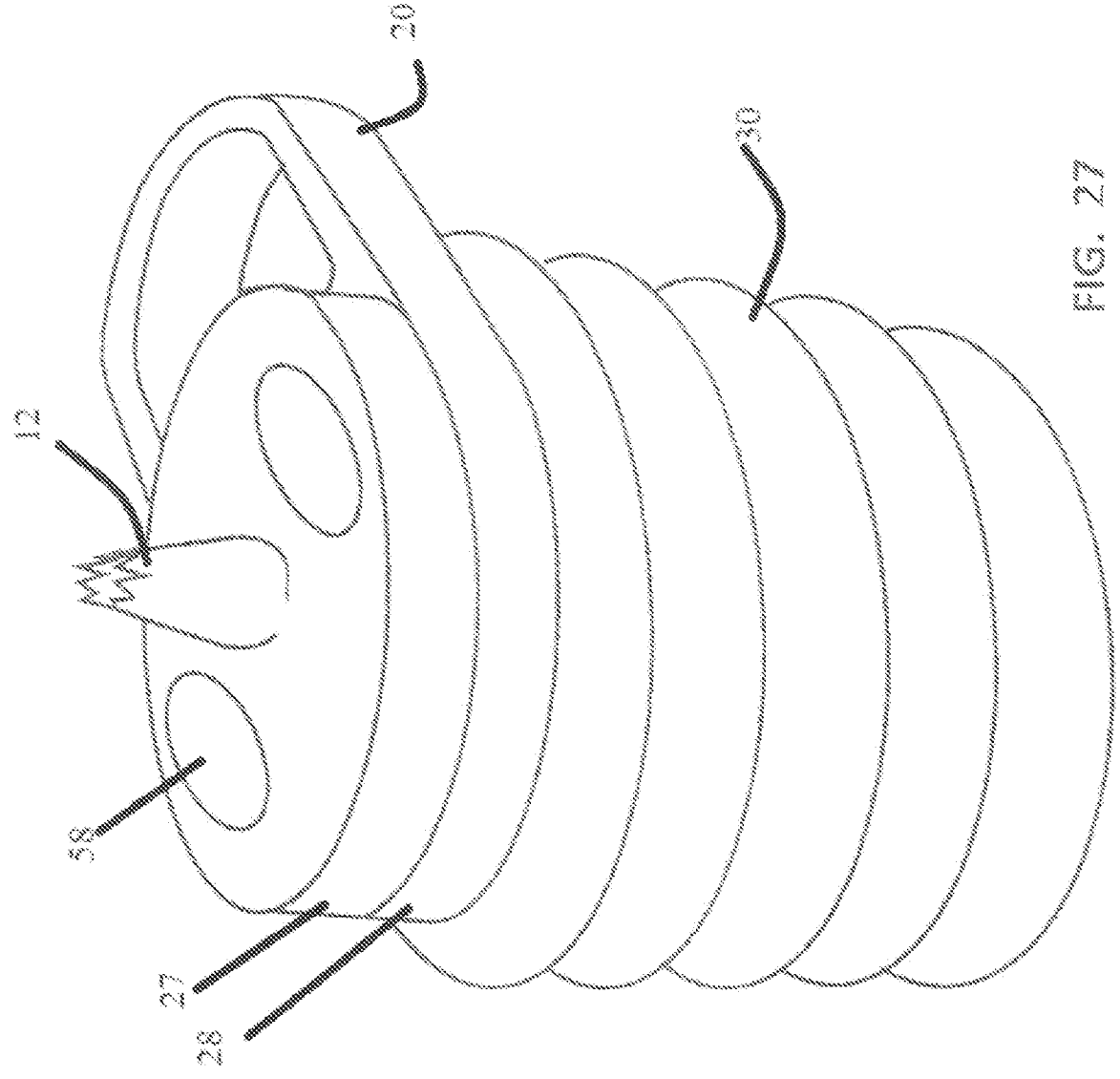
FIG. 27 illustrate an alternative design of the extension handle.
Figure 28:
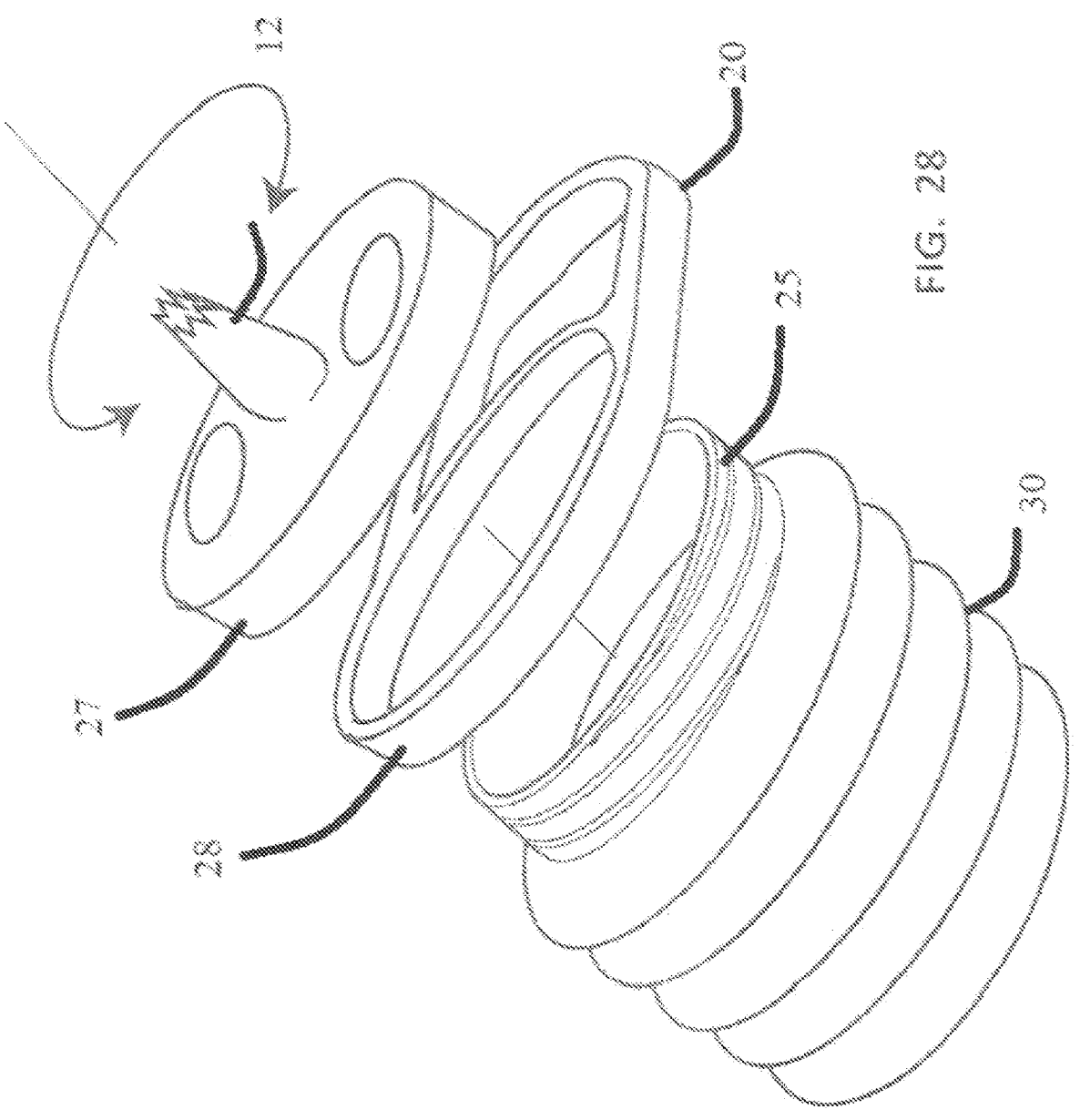
FIG. 28 illustrates the embodiment in FIG. 27 detached from the lid

With reference now to FIG. 1, a cake decorating tool (10) in accordance with aspects of the present invention is shown. In an example, the cake decorating tool (10) comprises a bottom container (30) and a lid member (20). FIG. 1 is a perspective view showing the cake decorating tool in an upright position.

The bottom container (30) includes a base with an opened top with a solid surrounding sidewall therebetween. The surrounding sidewall have one or more ribs incorporated therein and extending from the base to the opened top. A rim (25) circumferentially surrounding the opened top. The rim (25) having a smaller circumference in comparison to the bottom container (30).

The surrounding sidewall of the bottom container (30) forms an accordion shape with a circular cross-sectional shape. In the illustrated embodiment each larger outer rib has a circular shape sandwiched between a pair of opposing inner circles. The pair of opposing inner circles having a smaller circumference in comparison to the larger outer rib. Each rib has an arcuate shape or curve shape. Around the rim are one or more connecting members that are adapted to engage within the lid.

Bottom container (30) must be made of a material that is highly flexible and squeezable as well as safe for storage of food. The current most suitable plastics are as follows polyethylene terephthalate, high-density polyethylene, low-density polyethylene, polypropylene, or another suitable flexible plastic. In use, the material allows the user to squeeze the bottom of the container inwardly to disperse the fluid within the bottom container (30) through the spout (12).

The decorating tool further comprises a lid member that securely engages with the rim (25) of the bottom container (30). As shown, the lid member (20) has a top wall and a lip (27) depending from the top wall. As depicted the lip (27) surrounds the perimeter of the top wall and extends downwardly to a circumferentially surround peripheral edge. The lip (27) can further comprise an outer wall and an interior wall. The lip (27) can have interior threads for threaded engagement with male threads incorporated on the rim (25) or open end of the bottom container. Other means of connecting the lid member (20) to the bottom container (30) can be utilized.

The lid member (20) can further include one or more child protective connections incorporated therein. Child protective connections (55) is operationally mounted to the inside of the top wall of the lid member (20) disposed within the interior space adjacent the interior wall of the lip (27). The child protective connection (55) comprises a top protective cap disposed within the internal chamber of the lid member (20). The top protective cap further comprises threads for engaging with the rim (25) of the bottom container. When engaged with the rim (25) of the bottom container (30), the lid member (20) freely spins about the top protective cap. To disengage the lid member (20) from the lid member (20), pressure is placed on the top wall of the lid member (20) while simultaneously turning the lid member (20).

The lid member (20) further comprises a pouring spout (12) for allowing decorating fluid to flow from the interior space of the bottom container (30) to the outside via the passage or bore defined by an interior surface of the pouring spout. The pouring spout (12) can have a tubular body with a lower end that extends above, elevation-wise, the top wall of the lid member (20). The tubular body can be generally round that extends upward to a top end with an opening with a design integrally formed therein. The pouring spout (12) is formed by a bore that internally extends from the top end to the lower end. In one embodiment the pouring spout (12) lower end is integrally formed upon the top wall of the lid member and is stationary. In an alternative embodiment the pour spout (12) is configured with a movable interior stopper.

In the stationary embodiment, the pouring spout (12) has a perimeter defining a first opened end formed atop the top wall of the lid. A second opened end extends linearly upward and is formed remote from the first opened end. A pouring spout (12) length is defined between the first open end and the second open end from which the design spout is integrally formed therein. In the illustrated embodiment, the perimeter defining the first open end is larger than the perimeter defining the second open end, which produces a spout body that tapers inwardly as the spout (12) extends from the first open end to the second open end.

In the alternative embodiment the spout is separated at the first end. A stopper is disposed within the spout and is encircled by the interior space therebetween. In this alternative embodiment, the spout is pulled upward to allow fluid to flow from the interior of the bottom container (30) and the spout is pushed downward to prevent the flow of fluid from the bottom container (30). Additionally, a separate gasket O-Ring or an internally raised surface can be provided encircling the interior surface of the lid member (20) wherein the lid member can form an airtight seal against the rim (25) of the bottom container (30).

The lid member (20) can further include an attached handle. In one embodiment, the attached handle is an integrally formed ring that laterally and horizontally extend from one side of the lid member (20). In the illustrated embodiment, the handle has a ring section with two spaced apart extensions that extend from the ring section and integrally attaches to the lid member (20).

In one embodiment the lid member (20) can further comprise a handle having a ring section and a parallel pair of spaced apart extensions that can extend laterally and horizontally from the ring section. FIG. 1-6 show one embodiment of the ring extension handle that is integrally formed and extend from the top portion of the lid. FIGS. 15-20 show an alternative embodiment of the ring extension handle that is integrally formed and extend from the lower portion of the lid. FIGS. 21-27 show an alternative embodiment of the ring extension handle that is disposed below the lid and is attached thereto. FIGS. 28-32 show an alternative embodiment of the ring extension handle that is disposed below the lid hut is detached therefrom. Each aforementioned embodiment can be manufactured with a stationary or movable spout as described above.

In the alternative embodiment depicted in FIGS. 1-4, the handle of lid member (20) can have a ring section with a pair of two parallel spaced apart extensions. Each extension can be pivotably attached to opposing sides of the lid member (20). Each extension can be provided with a pivot hole and can be pivotably attached to the lid member (20) via a pivot pin. The handle can pivot about the pivot pin through the aligned holes of the two spaced apart extensions. The pivot holes are aligned in a parallel arrangement on opposite sides of the lid.

In use, a user would place their thumb at the bottom and their index and middle finger on the two finger dips (58) located on the top wall of the lid member (20). Each finger dip (58) can be a recessed area that can support the upper tip of the index and the middle finger. Alternatively, a grip member can be located on the bottom wall of the bottom container (30). The grip member can be raised ridges or a recessed area to support the tip of thumb. The grip member will be placed in a position where it does not affect the ability for the bottom wall of the bottom container (30) stand upright on a flat surface.

The decorating container 10 shown in the drawings and described in detail herein disclose arrangements of elements of particular construction and configuration for illustrating preferred embodiments of structure and method of operation of the present invention. It is to be understood, however, that elements of different construction and configuration and other arrangements thereof, other than those illustrated and described may be employed for providing a decorating container 10 in accordance with the spirit of this invention, and such changes, alternations and modifications as would occur to those skilled in the art are within the scope of this invention as broadly defined in the appended claims.

The invention claimed is:

1. A cake decorating tool, the tool comprising:
a container defined by a bottom wall with a surrounding sidewall linearly extending to an opened top;
the surrounding sidewall having one or more ribs integrally formed therein and extending from the bottom wall to the opened top;
a rim integrally formed therein and circumferentially surrounding the opened top of the container;
the rim having a smaller circumference in comparison to the container;
the surrounding sidewall of the container forms an accordion shape with a circular cross-sectional shape with a plurality of ribs;
wherein each of the ribs have a larger circular shape sandwiched between a pair of opposing inner circles;
each of the ribs having an arcuate shape;

wherein the bottom wall is flat;

the pair of opposing inner circles having a smaller circumference in comparison to a larger outer rib; and a lid member that securely engages with the rim of the container;

the lid member is defined by a top wall with a lip depending from the top wall;

the lip surrounds a perimeter of the top wall and extends downwardly to a circumferentially surrounding peripheral edge;

the lip is defined by an outer wall and an interior wall;

interior threads for threaded engagement with male threads incorporated on the rim; and child protective connections operationally mounted to an inside of the top wall of the lid member and are disposed within an interior space adjacent the interior wall of the lip thereby when the child protective connections are engaged the lid member continuously rotates about the rim;

the lid member further comprises a pouring spout having a tubular body for allowing decorating fluid to flow from an interior space of the container through a passage bore defined by an interior surface of the pouring spout;

the tubular body extending upward to a top end with an opening having a design incorporated therein thereby allowing decorating fluid to flow therefrom;

the container being made of a plastic material that is flexible and squeezable and that is configured for storage of food.

2. The cake decorating tool of claim 1, wherein the plastic material is selected from the group consisting of polyethylene terephthalate, high-density polyethylene, low-density polyethylene, and polypropylene.

3. The cake decorating tool of claim 1, wherein the pouring spout is operationally configured with a movable interior stopper within the tubular body, wherein the movable interior stopper is pulled upward to allow fluid to flow from the interior space of the container and is pushed downward to prevent the flow of fluid from the container.

4. The cake decorating tool of claim 1, wherein the tubular body has a perimeter defined by a first open end and a second open end, wherein the tubular body that tapers inwardly as the spout extends from the first open end to the second open end.

5. The cake decorating tool of claim 1, wherein the lid member further comprises a separate gasket O-Ring or an internally raised surface encircling an interior surface of the lid member wherein the lid member forms an airtight seal against the rim of the container.

6. The cake decorating tool of claim 1, wherein the lid member further comprises an internally raised surface encircling an interior surface of the lid member wherein the lid member forms an airtight seal against the rim of the container.

7. The cake decorating tool of claim 1, wherein the lid member has an attached handle, the attached handle is defined by an integrally formed ring that laterally and horizontally extends from one side of an outer surface of the lip of the lid member, and the handle includes a ring section with two spaced apart extensions that extends from the ring section and integrally attaches to the outer surface of the lip of the lid member.

8. The cake decorating tool of claim 7, wherein the ring section of the handle that is integrally formed extends from an outer surface of a top portion of the lip of the lid member.

9. The cake decorating tool of claim 7, wherein the ring section of the handle that is integrally formed extends from an outer surface of a lower portion of the lip of the lid member.

10. The cake decorating tool of claim 7, wherein the ring section is disposed below the lid member and is attached thereto.

11. The cake decorating tool of claim 7, wherein the ring section is disposed below the lid member and is detached therefrom.

12. The cake decorating tool of claim 1, wherein the lid member has a handle with a ring section with a pair of two parallel spaced apart extensions with each extension pivotably attached to opposing sides of the lip of the lid member;

each of the extensions having a pivot hole that is pivotably attached to the lid member via a pivot pin;

the handle pivots about the pivot pin through the aligned holes of the two spaced apart extensions; and the pivot holes are aligned in a parallel arrangement on opposite sides of the lid.

13. The cake decorating tool of claim 1, wherein the lid member further comprises a pair of circular indentations for receiving an index finger and a middle finger of a user.

14. The cake decorating tool of claim 13, wherein the bottom wall of the container further comprises a slightly raised surface for receiving a thumb finger of the user.

\* \* \* \* \*